US008641858B2

(12) United States Patent
Ohashi et al.

(10) Patent No.: US 8,641,858 B2
(45) Date of Patent: Feb. 4, 2014

(54) AIRTIGHT CONTAINER MANUFACTURING METHOD, AND IMAGE DISPLAYING APPARATUS MANUFACTURING METHOD USING AIRTIGHT CONTAINER MANUFACTURING METHOD

(75) Inventors: Yasuo Ohashi, Hadano (JP); Tomonori Nakazawa, Atsugi (JP); Kosuke Kurachi, Kawasaki (JP); Masahiro Tagawa, Isehara (JP); Mitsutoshi Hasegawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 667 days.

(21) Appl. No.: 12/361,837

(22) Filed: Jan. 29, 2009

(65) Prior Publication Data

US 2009/0199963 A1 Aug. 13, 2009

(30) Foreign Application Priority Data

Feb. 7, 2008 (JP) ................................ 2008-027541

(51) Int. Cl.
*B29C 65/00* (2006.01)

(52) U.S. Cl.
USPC .................................... 156/273.9; 156/275.1

(58) Field of Classification Search
USPC .......... 156/273.9, 272.2, 272.8, 275.1, 275.5, 156/275.7; 216/121.62; 65/36, 58
See application file for complete search history.

(56) References Cited

U.S. PATENT DOCUMENTS 6,126,505 A * 10/2000 Narayanan et al. ............ 445/25
6,195,214 B1 * 2/2001 Muray et al. ................. 359/819
6,621,220 B1 9/2003 Hasegawa et al. ............ 313/634
6,722,937 B1 4/2004 Ludwig et al.
7,473,152 B1 1/2009 Ludwig et al.
2005/0000641 A1 * 1/2005 Hartmann et al. ......... 156/272.8
2006/0042748 A1 3/2006 Hasegawa et al. ............ 156/285
2009/0029622 A1 1/2009 Koyanagi et al. ............... 445/24
2009/0071588 A1 3/2009 Kimura et al. .................. 156/64
2009/0120915 A1 5/2009 Tagawa et al. ........... 219/121.62

FOREIGN PATENT DOCUMENTS

JP 59-050057 A 3/1984
JP 2000-149783 5/2000
JP 2004-513473 A 4/2004

OTHER PUBLICATIONS

English Machine Translation JP 200-149783.*

* cited by examiner

*Primary Examiner* — Richard Crispino
*Assistant Examiner* — Elizabeth Royston
(74) *Attorney, Agent, or Firm* — Fitzpatrick, Cella, Harper & Scinto

(57) ABSTRACT

A manufacturing method provides an airtight container having a first plate structure, a second plate structure having a wiring formed on a surface facing the first plate structure, a frame arranged between the first plate structure and the second plate structure, a first bonding material arranged between the first plate structure and the frame, and a second bonding material arranged between the second plate structure and the frame. The method includes the steps of bonding the first plate structure and the frame by irradiating a first energy beam to the first bonding material by transmitting the first energy beam through the first plate structure, and bonding the second plate structure and the frame by irradiating a second energy beam to the second bonding material by transmitting the second energy beam through the first plate structure and the frame. The first energy beam and the second energy beam are scanned in close proximity to each other and at the same speed.

6 Claims, 6 Drawing Sheets

AIRTIGHT CONTAINER MANUFACTURING METHOD, AND IMAGE DISPLAYING APPARATUS MANUFACTURING METHOD USING AIRTIGHT CONTAINER MANUFACTURING METHOD

BACKGROUND OF THE INVENTION

1. Field of the Invention

The present invention relates to an airtight container, and a manufacturing method of an image displaying apparatus using the airtight container.

2. Description of the Related Art

As one example of a method of manufacturing an airtight glass envelope in which vacuum is maintained, there is a method in which a frit glass is used. In this method, the frit glass acting as a sealant is applied or set between respective glass members such as a face plate, a rear plate and an outer frame. Then, in such a state, the acquired subject matter is entered into a sealing furnace such as an electric furnace or the like or set on a hot plate (or interposed between the upper hot plate and the lower hot plate), and the entire subject matter (that is, the face plate, the rear plate and the outer frame) is heated up to a sealing temperature. Thus, since the frit glass is melted by this heating, the face plate and the outer frame are sealed together, and also the rear plate and the outer frame are sealed together. In conclusion, the glass envelope is formed by this method.

Besides, Japanese Patent Application Laid-Open No. 2000-149783 discloses a manufacturing method of a glass envelope. In this method, first, a sealing portion and its vicinity are heated by a sub local heater, and the entire glass envelope other than the sealing portion and its vicinity is heated by an assist heating hot plate heater. Then, a rear-plate frit glass constituting the sealing portion between a rear plate and an outer frame is locally heated up to a sealing temperature as being irradiated and scanned by a semiconductor laser. Subsequently, a face-plate frit glass constituting the sealing portion between a face plate and the outer frame is locally heated up to the sealing temperature as being irradiated and scanned by the semiconductor laser. That is, in Japanese Patent Application Laid-Open No. 2000-149783, such semiconductor laser irradiation is performed obliquely from the upper side of the outer frame, and the irradiation to the rear-plate frit glass is performed independently of the irradiation to the face-plate frit glass.

In the manufacturing method of the glass envelope as disclosed in Japanese Patent Application Laid-Open No. 2000-149783, since an incident energy beam is entered from the side of the outer frame, a part of the energy beam is totally reflected inside the outer frame. For this reason, since the energy does not reach the frit glass acting as a bonding material, there is a problem that it is difficult to effectively utilize the energy.

Further, the remainder of the incident energy beam entered from the side of the frit glass acting as the bonding material enlarges a temperature distribution of the bonding material. For this reason, there is a problem that bonding intensity decreases according as an area in which excellent bonding can be acquired decreases.

On the above premise, it is desirable to solve the above conventional problems. At the same time, it is also desirable to improve a "takt time" in the manufacture of the glass envelope.

SUMMARY OF THE INVENTION

That is, an object of the present invention is to provide a manufacturing method of an airtight container, to be used to manufacture the glass envelope, which enables to improve the "takt time" in manufacture as enabling to effectively utilize the energy beam and also acquire desired bonding intensity.

To achieve the above object, according to the present invention, there is provided a manufacturing method of an airtight container which has a first plate structure, a frame, and a second plate structure that a wiring is arranged on the surface of the second plate structure on the side of the first plate structure. The manufacturing method comprises the following steps.

That is, in the manufacturing method, an arrangement step is provided to arrange, between the first plate structure and the frame, a first bonding material for bonding the first plate structure and the frame by melting, and to arrange, between the second plate structure and the frame, a second bonding material for bonding the second plate structure and the frame by melting. After the arrangement step, a first bonding step is provided to bond the first plate structure and the frame by irradiating an energy beam to the first bonding material as transmitting the energy beam through the first plate structure. Moreover, a second bonding step is provided to bond the second plate structure and the frame by irradiating the energy beam to the second bonding material as transmitting the energy beam through the frame so that the energy beam transmits through the first plate structure and the surface of the frame on the side of the first plate structure.

In consequence, the present invention enables to improve the "takt time" in the manufacture as enabling to effectively utilize the energy beam and also acquire the desired bonding intensity.

The accompanying drawings, which are incorporated in and constitute a part of the specification, illustrate the exemplary embodiments of the present invention and, together with the description, serve to describe and explain the principle of the present invention.

DESCRIPTION OF THE EMBODIMENTS

Figure 1A:
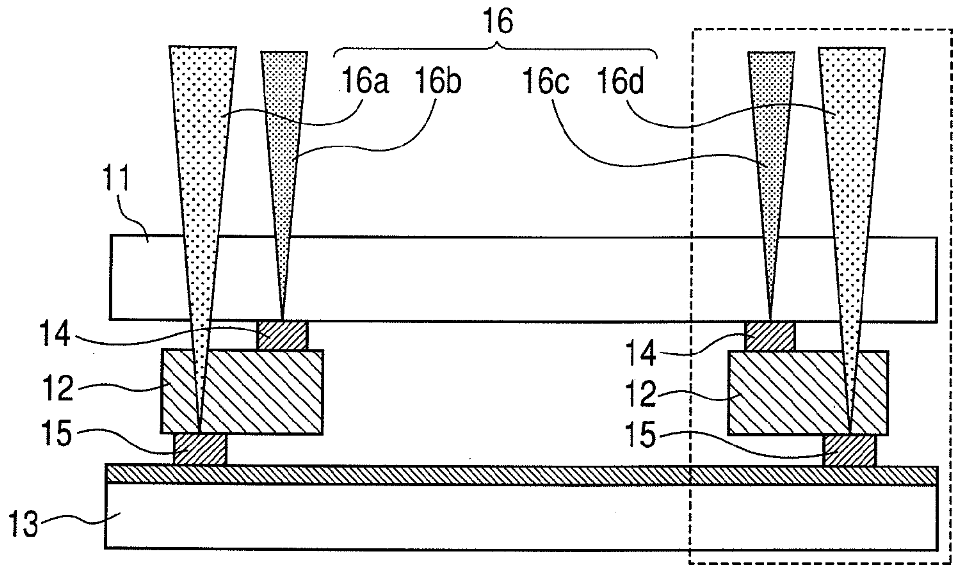
FIG. 1A is a cross section diagram for describing an example of a manufacturing method of an airtight container according to the present invention.

An airtight container according to the present invention includes a first plate structure, a second plate structure and a frame. In the airtight container, a first bonding material is set between the first plate structure and the frame so as to bond the first plate structure and the frame, and a second bonding material is set between the second plate structure and the frame so as to bond the second plate structure and the frame. That is, the first plate structure and the frame are bonded by the first bonding material, and the second plate structure and the frame are bonded by the second bonding material.

Further, a wiring is provided on the second plate structure, and the provided wiring extends up to the outside of the space surrounded by the first plate structure, the second plate structure and the frame. For example, in a case where a displaying device is arranged within the airtight container so that the arranged displaying device is connected to the wiring, it is possible to constitute an image displaying apparatus in which electric potential can be supplied to the displaying device by applying the electric potential to the wiring. Here, it should be noted that a material of which the optical transparency is low due to a demand of a resistance value or the like is used as the material of the wiring.

Furthermore, as a method of bonding the first plate structure and the frame and of bonding the second plate structure and the frame, a method of irradiating an energy beam to the first and second bonding materials is used because it is advantageous in the point capable of heating only the portion intended to be heated.

Furthermore, as a method of irradiating the energy beam, a conventionally known method can of course be used. In addition, it is possible to use a method of irradiating the energy beam to the second bonding material from the side of the second plate structure opposite to the second bonding material as transmitting it through the second plate structure.

However, in regard to the airtight container which has the constitution that the wiring is provided on the second plate structure, the wiring extends up to the outside of the airtight container through the bonding portion between the second plate structure and the frame. This implies that the wiring resultingly exists between the second plate structure and the frame. That is, the bonding portion between the second plate structure and the frame includes the second plate structure, the wiring, the second bonding material and the frame in this order.

For this reason, in the airtight container of the above constitution, since the energy beam is weakened or shut out because the wiring exists, there is a possibility that it is impossible to supply sufficient energy to the bonding material between the wiring and the frame. Therefore, there is a possibility that the bonding between the second plate structure and the frame is insufficient.

Consequently, the present invention intends to irradiate the energy beam to both the first bonding material and the second bonding material as transmitting it through the first plate structure. By doing so, it is possible to achieve excellent bonding between the second plate structure and the frame.

In the following, the exemplary embodiments of the present invention will be concretely described with reference to FIGS. 1A to 9.

Figure 1B:
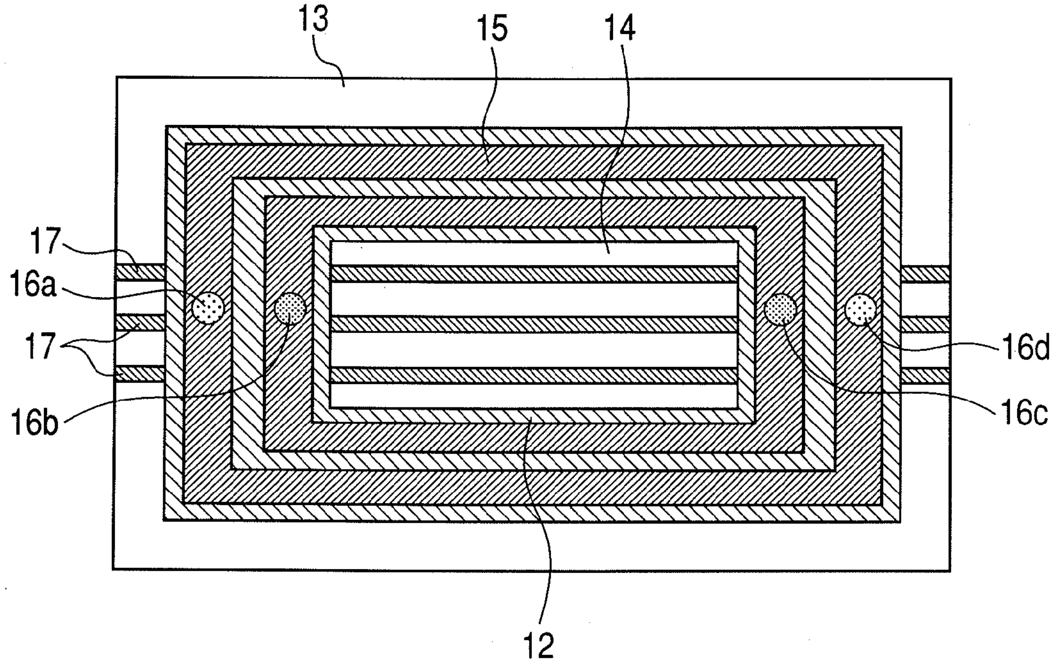
FIG. 1B is a top plan view for describing the example of the manufacturing method of the airtight container according to the present invention.

FIGS. 1A and 1B are diagrams illustrating the airtight container according to the present invention. More specifically, FIG. 1A is the cross section diagram for describing an example of a manufacturing method of the airtight container according to the present invention, and FIG. 1B is the top plan view for describing the example of the manufacturing method of the airtight container according to the present invention. FIGS. 2 to 5 are the diagrams respectively illustrating the portion surrounded by the dotted line in FIG. 1A (however, wirings 17 in FIG. 1B are not illustrated). More specifically, FIGS. 2 to 5 are used to describe the arrangements of the first bonding material and the second bonding material to which the airtight container according to the present invention is applied. Likewise, FIGS. 6 to 9 are the diagrams respectively illustrating the portion surrounded by the dotted line in FIG. 1A. More specifically, FIGS. 6 to 9 respectively illustrate other examples of the arrangement of the bonding materials to be used for the manufacture of the airtight container according to the present invention.

In FIGS. 1A and 1B, each of a first plate structure 11, a frame 12 and a second plate structure 13 is composed of a material such as a glass, a plastic or the like through which a specific energy beam 16 can be transmitted. Further, in regard to each of the first plate structure 11, the frame 12 and the second plate structure 13, a high degree of vacuum is required. In addition, if the inside of each of the first plate structure 11, the frame 12 and the second plate structure 13 is a space and thus an atmospheric pressure resistant structure is necessary, it is preferable to apply a glass through which it is more difficult to transmit gas molecules and of which the stiffness is high. Incidentally, it should be noted that the energy beam 16 includes energy beams 16*a*, 16*b*, 16*c* and 16*d*.

The thickness of the frame 12 in the direction along which the first and second plate structures face each other (that is, the thickness of the frame 12) is substantially 0.5 mm or more and 2 mm or less. Further, the thickness of the frame 12 in the direction perpendicular to the direction along which the frame 12 extends (that is, the width of the frame 12) is substantially 1 mm or more and 10 mm or less.

Each of a first bonding material 14 and a second bonding material 15 is composed of a material such as a metal, a glass, a resin or the like which absorbs the specific energy beam 16. Here, it is desirable to use, in these kinds of materials, the metal such as aluminum or the like, because material and processing costs are low.

In any case, these members are arranged so that the second plate structure 13 on which wirings 17 have been formed, the second bonding material 15, the frame 12, the first bonding material 14 and the first plate structure 11 are positioned in this order. At this time, if the second bonding material 15 is an electric conductor such as metal or the like, a process of covering the wirings 17 with an insulating material is performed as circumstances demand. Further, it should be noted that the wirings 17 are arranged so as to be connected to the displaying device.

Incidentally, the first bonding material and the second bonding material may previously be bonded or formed on the surface of any of the first plate structure, the frame and the second plate structure.

The energy beam 16 may be light of a lamp, an electron beam, a laser beam (microwave, infrared ray, visible light, ultraviolet light, X-ray), or the like. Here, it is desirable to use the laser beam because it can narrow down an irradiation spot (that is, it can focus the light) to reduce an influence of heat and the like to the surroundings and it can be easily acquired. In particular, it is desirable to use the laser beam which has a wavelength within the range from visible light to near-infrared light, because the relevant laser beam can be transmitted through the glass and absorbed by the metal such as aluminum or the like. In this connection, it is more desirable to use the laser beam having the wavelength of about 800 nm to 1100 nm because it can be easily acquired.

The energy beam 16 is irradiated onto the surface of the frame 12 on the side of the first plate structure 11. At this time, an incident angle of the energy beam 16 in regard to the surface of the frame 12 on the side of the first plate structure 11 and the position of the energy beam 16 in regard to the width of the frame 12 are appropriately adjusted so that at least a part of the region irradiated by the energy beam is projected within the surface of the second bonding material 15 on the side of the frame 12.

Here, the region of the irradiated energy beam 16 on the surface of the frame 12 on the side of the first plate structure 11 is the region where the relevant energy beam 16, which is refracted and transmitted through the first plate structure 11, reaches the frame 12 without being absorbed by the first bonding material 14. Further, the incident angle of the energy beam 16 in regard to the surface of the frame 12 on the side of the first plate structure 11 can be achieved even if an arbitrary value within the range of −90° to +90° is taken in regard to any of the direction along the frame 12 and the direction perpendicular to the frame 12.

In order to satisfy such an irradiation condition as described above, for example, it is conceivable that the first plate structure 11, the frame 12, the second plate structure 13, the first bonding material 14 and the second bonding material 15 are arranged as illustrated in FIGS. 2 to 5.

Figure 2:
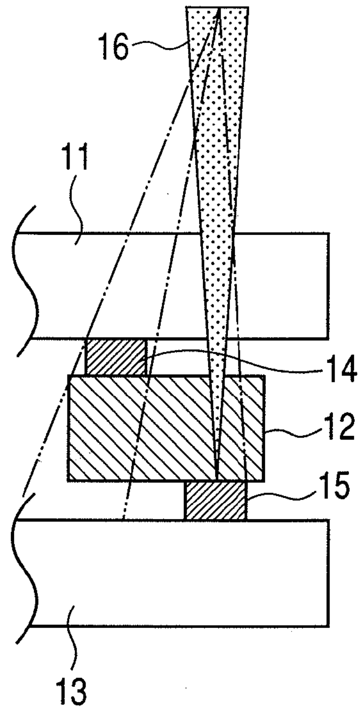
FIG. 2 is a diagram illustrating an example of an arrangement of bonding materials to be used for the manufacture of the airtight container according to the present invention.

In FIG. 2, the first bonding material 14 is arranged so as to be shifted in the direction in parallel with the surface of the first plate structure 11, and the second bonding material 15 is arranged so as to be shifted in the direction in parallel with the surface of the second plate structure 13. Then, the incident energy beam 16 vertically entered into the surface of the first plate structure 11 is irradiated to the second bonding material 15.

Figure 3:
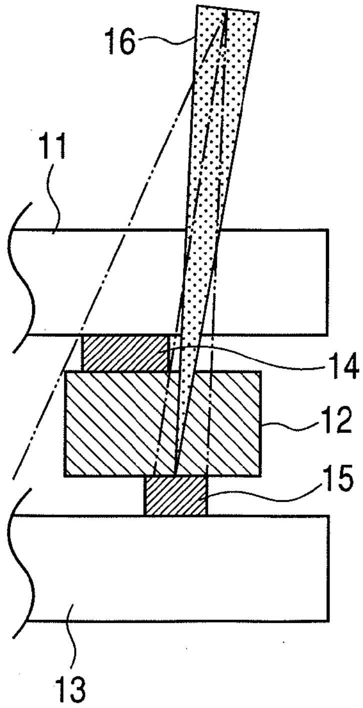
FIG. 3 is a diagram illustrating another example of an arrangement of the bonding materials to be used for the manufacture of the airtight container according to the present invention.

Further, the incident angle of the energy beam 16 is set to be perpendicular to the surface of the first plate structure 11 as illustrated in FIG. 2. However, the incident angle of the energy beam 16 may be adjusted as illustrated in FIG. 3. More specifically, the incident angle of the energy beam 16 illustrated in FIG. 3 is not perpendicular to the surface of the first plate structure 11 but is slightly inclined.

Figure 4:
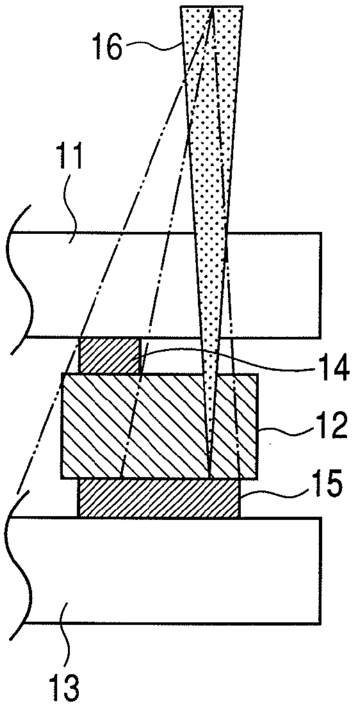
FIG. 4 is a diagram illustrating still another example of an arrangement of the bonding materials to be used for the manufacture of the airtight container according to the present invention.
Figure 5:
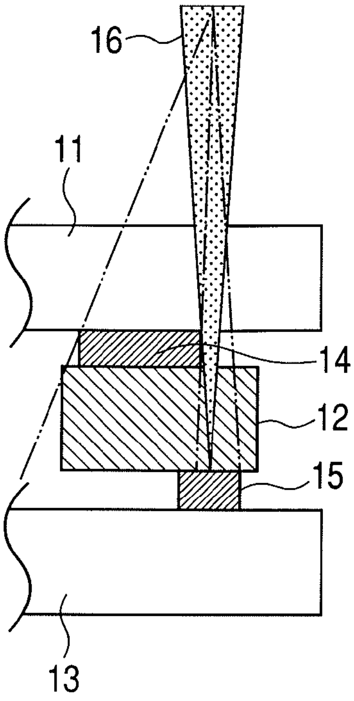
FIG. 5 is a diagram illustrating still another example of an arrangement of the bonding materials to be used for the manufacture of the airtight container according to the present invention.

Moreover, the second bonding material 15 may have the portion which is positioned directly below the first bonding material 14, as illustrated in FIG. 4. Alternatively, the first bonding material 14 may have the portion which is positioned directly above the second bonding material 15.

Incidentally, the second bonding material 15 which has the same width as that of the first bonding material 14 may be arranged directly below the first bonding material 14 so that the second bonding material 15 correctly faces the first bonding material 14.

Figure 6:
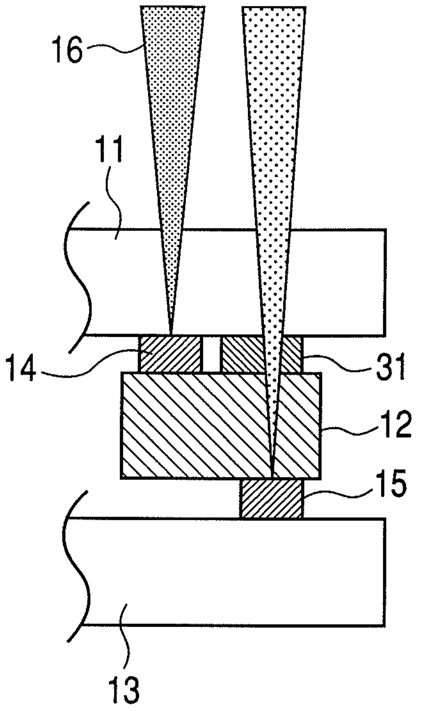
FIG. 6 is a diagram illustrating still another example of an arrangement of the bonding materials to be used for the manufacture of the airtight container and an example of irradiation of an energy beam, according to the present invention.
Figure 7:
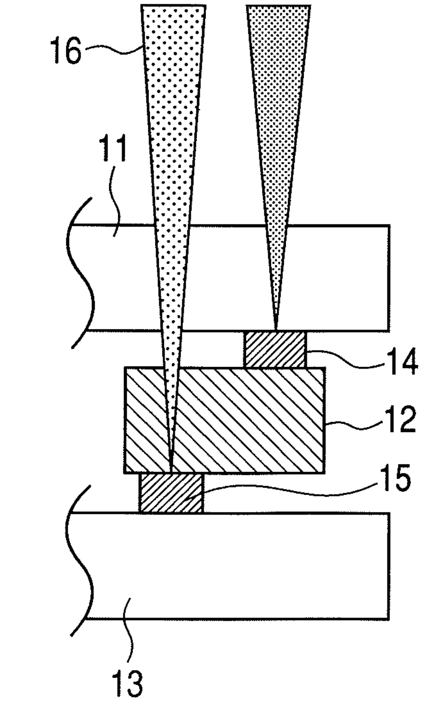
FIG. 7 is a diagram illustrating still another example of an arrangement of the bonding materials to be used for the manufacture of the airtight container and another example of irradiation of the energy beam, according to the present invention.

Alternatively, as illustrated in FIG. 6, a member 31 through which the energy beam 16 is transmitted may be arranged in the vicinity of the first bonding material 14, between the first plate structure 11 and the frame 12. Further, as illustrated in FIG. 7, the physical relationship between the first bonding material 14 and the second bonding material 15 may be inversed.

After the above-described arrangement process, as illustrated in FIG. 1B, the energy beams **16*b* and 16*c* each having a local beam spot shape being transmitted through the first plate structure 11 are irradiated surroundedly along the first bonding material 14. Further, the energy beams 16*a* and 16*d* each having a local beam spot shape being transmitted through the first plate structure 11 and the frame 12 are irradiated surroundedly along the second bonding material 15**. Here, the substantial beam spot size is 0.1 mm to 10 mm if the beam spot is circular, the power thereof is 10 W to 1 kW, and the moving speed thereof is 0.001 m/sec to 10 m/sec.

Then, the first bonding material 14 and the second bonding material 15 are locally softened or melted, whereby the first plate structure 11 and the frame 12 are bonded, and further the frame 12 and the second plate structure 13 are bonded.

Incidentally, the energy beam 16 is irradiated to the second bonding material 15 so that the energy beam 16 is transmitted through the surface of the frame 12 on the side of the first plate structure 11. Consequently, it is preferable because the energy beam 16 can be irradiated to the second bonding material 15 in the state that energy absorption efficiency is high.

This can be explained as follows. That is, if the wavelength of the energy beam 16 is equal to or less than 1 μm, the refractive index of commonly used glass and the refractive index of commonly used resin such as plastic or the like are typically about 1.45 or more. At this time, if an angle (incident angle) of the energy beam in regard to the direction perpendicular to the contact surface between the frame 12 and the second bonding material 15 becomes 40° or more, the energy beam 16 is totally reflected on the contact surface between the frame 12 and the second bonding material 15, whereby the second bonding material 15 is not sufficiently heated.

Here, in a case where the energy beam is irradiated so as to be transmitted along the side surface of the frame 12, the incident angle of the energy beam in regard to the contact surface between the frame 12 and the second bonding material 15 exceeds 40° even if the incident angle in regard to the side surface of the frame 12 is set to any angle. This is because the energy beam is refracted on the side surface of the frame 12 due to a difference between the refractive index of the atmosphere and the refractive index of the frame 12, and thus the range of the incident angle to the contact surface between the frame 12 and the second bonding material 15 decreases. For this reason, since the energy beam is totally reflected on the contact surface between the frame 12 and the second bonding material 15, the energy beam is not absorbed by the second bonding material 15.

On the other hand, if the energy beam 16 is irradiated so as to be transmitted through the surface of the frame 12 on the side of the first plate structure 11, the incident angle of the energy beam in regard to the contact surface between the frame 12 and the second bonding material 15 can be set to be less than 40°.

Incidentally, it is also conceivable to adopt, as a method of heating the second bonding material 15, a method of directly irradiating the energy beam 16 to the side surface of the second bonding material 15. In this method, heat generation on the side surface of the second bonding material 15 is large, and the temperature distribution of the second bonding material 15 is large. For this reason, since the temperature region capable of achieving an excellent bonding state becomes narrow, the bonding region becomes narrow.

On the other hand, in the manufacturing method according to the present invention, the energy can be transmitted to the second bonding material 15 as maintaining the energy beam spot size. Therefore, it is possible to acquire the wide region in which the temperature distribution is gradual so that an excellent bonding state can be maintained.

Figure 8:
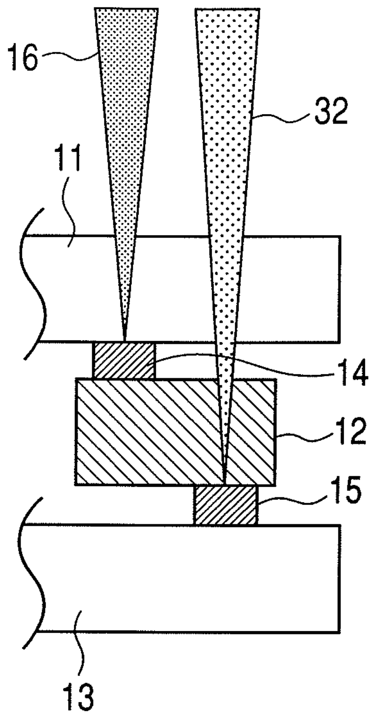
FIG. 8 is a diagram illustrating still another example of an arrangement of the bonding materials to be used for the manufacture of the airtight container and still another example of irradiation of the energy beam, according to the present invention.

In order to achieve more preferable bonding, as illustrated in FIG. 8, the spot size, the power, the moving speed, the wavelength and the like of each of the energy beam 16 in regard to the first bonding material 14 and a second energy beam 32 in regard to the second bonding material 15 may arbitrarily be adjusted.

Figure 9:
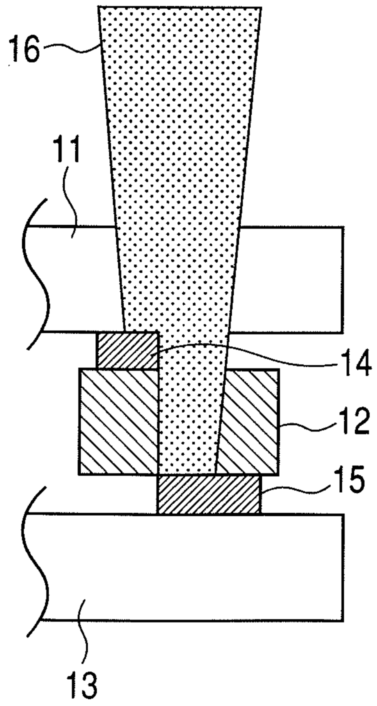
FIG. 9 is a diagram illustrating still another example of an arrangement of the bonding materials to be used for the manufacture of the airtight container and still another example of irradiation of the energy beam, according to the present invention.

Further, in order to lower apparatus costs by more simplifying the constitution of the apparatus and thus improve the “takt time” of the energy beam irradiation, an irradiation method as illustrated in FIG. 9 may be adopted. More specifically, to simultaneously irradiate the energy beam to the first bonding material 14 and the second bonding material 15, the beam spot shape of the energy beam 16 may be adjusted to have a circle, an oval, a rectangle or the like. Alternatively, an energy density distribution in the beam spot may be set to have an arbitrary profile such as a uniform distribution, a normal distribution or the like.

Furthermore, the number of the energy beams 16, namely, the number of the energy sources, may be “one” or “two or more”. That is, the desired number of the energy beams can be selected in consideration of the “takt time” of the process and the apparatus costs. Incidentally, if the plural energy beams 16 are set, it is possible to perform scanning by these beams distantly or closely. Namely, it is possible to select a proper physical relationship of these beams in consideration of the temperature distribution. Besides, the energy beam 16 may be irradiated to the same position once or plural times. In the latter case, to acquire suitable bonding, the energy intensity and the beam spot shape of each of the plural energy beams 16 may be different from others.

Incidentally, as described above, after the second plate structure 13, the second bonding material 15, the frame 12, the first bonding material 14 and the first plate structure 11 were all arranged, the energy beam is irradiated in the present invention. On the other hand, it is conceivable that the energy beam 16 is irradiated after the second plate structure 13, the second bonding material 15 and the frame 12 were arranged, and, thereafter the energy beam is irradiated again after the first bonding material 14 and the first plate structure 11 are arranged. Here, in such a two-stage arranging and bonding process, the “takt time” of the manufacturing process deteriorates. On the other hand, according to the present invention, the “takt time” can be shortened because the arranging process can be omitted once. Therefore, this is a more preferable manufacturing method.

Subsequently, an example of the image displaying apparatus constituted by using the above-described airtight container will be described with reference to FIG. 10.

Figure 10:
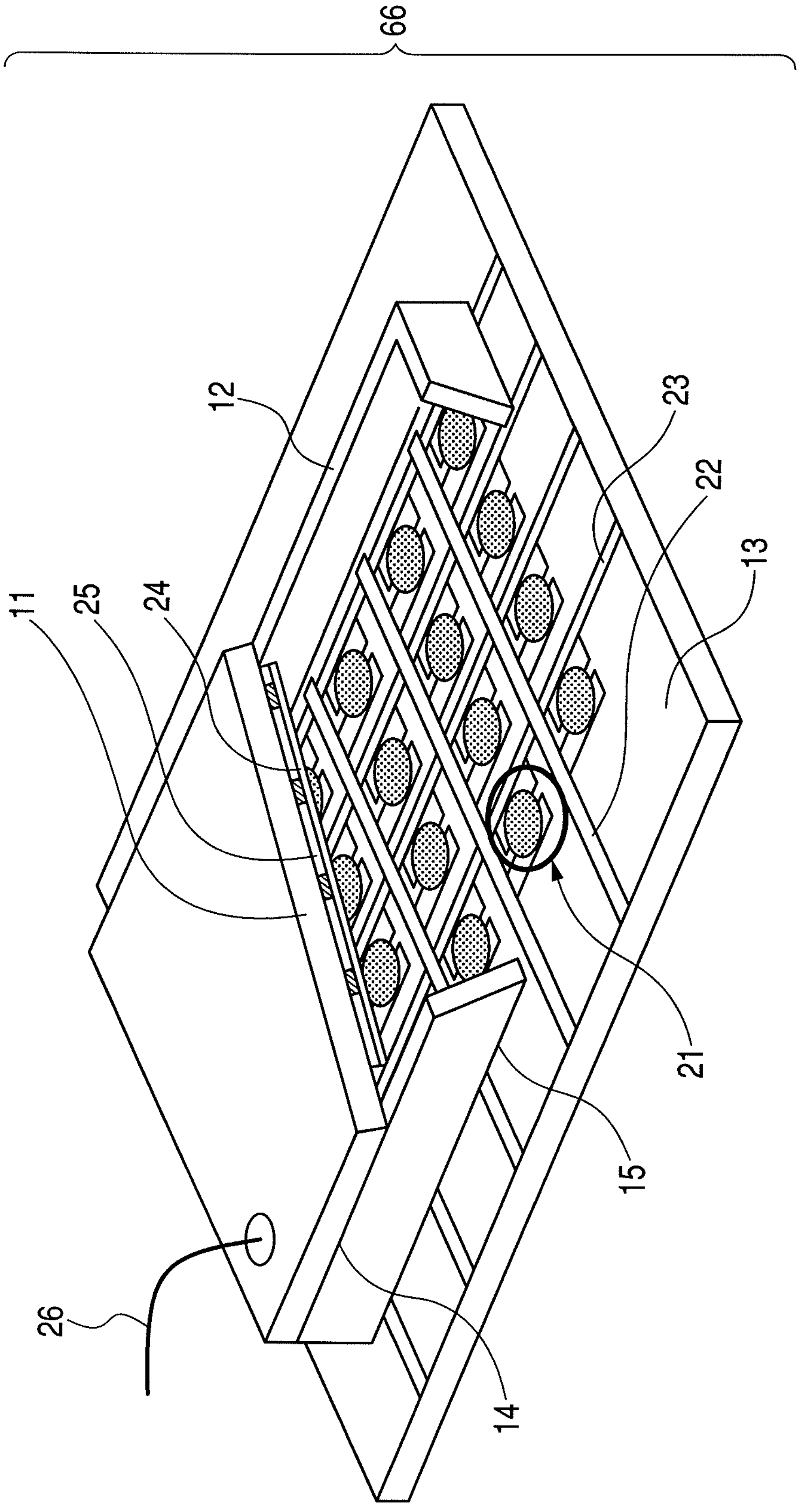
FIG. 10 is a cutaway perspective diagram of an image displaying apparatus constituted by using the airtight container according to the present invention.

FIG. 10 is the perspective diagram of the image displaying apparatus which is equipped with an electron-emitting device. As a matter of convenience in explanation, FIG. 10 illustrates the displaying apparatus of which the part has been cut away.

More specifically, FIG. 10 illustrates an electron-emitting device portion 21, a row-directional wiring 22 and a column-directional wiring 23 which are connected to a pair of electrodes of the electron-emitting device, a metal back 24, a fluorescent film 25, and a terminal 26 through which potential is supplied to the metal back 24. Here, it should be noted that the row-directional wiring 22 and the column-directional wiring 23 together correspond to the previously described wiring 17. Incidentally, if at least one not-illustrated support body called a spacer is provided between the face plate and an electron source substrate, it is possible to constitute an envelope 66 which has sufficient intensity against the atmospheric pressure.

The manufacturing method of the image displaying apparatus illustrated in FIG. 10 will be described hereinafter.

(1) The fluorescent film 25 and the metal back 24 are provided on the first plate structure 11 according to a conventionally known method.

(2) The electron-emitting device portion 21, the row-directional wiring 22 and the column-directional wiring 23 are provided on the second plate structure 13 according to a conventionally known method.

(3) The first plate structure 11 acquired in the process (1) and the second plate structure 13 acquired in the process (2) are set to face to each other. Then, the first plate structure 11, the first bonding material 14, the frame 12, the second bonding material 15 and the second plate structure 13 are arranged in this order.

(4) The energy beam is irradiated to the first bonding material 14 and the second bonding material 15 by applying the above-described airtight container manufacturing method, so as to bond the first plate structure 11 and the frame 12 and also to bond the second plate structure 13 and the frame 12.

By the above method, it is possible to form the image displaying apparatus.

Incidentally, the image displaying apparatus according to the present invention is applicable not only to the above-described apparatus using the electron-emitting device but also to an apparatus using an organic EL (electroluminescence) as a displaying device, a plasma display and the like.

Embodiment 1

In the manufacturing method of the airtight container according to the present invention, as illustrated in FIGS. 1A and 1B, a thin film device, wirings, an insulation material and other materials are first formed on a high distortion point glass substrate having a diagonal line of 7 inches, thereby forming the first plate structure and the second plate structure. Here, the thin film device is the device for constituting the displaying device, the wirings are to transmit signals for driving the thin film device, and the insulation material is to secure insulation between the wirings and the bonding material.

Incidentally, each of the first and second plate structures, which are applied for an existing a flat surface displaying apparatus, is used as it is. Further, the operation process before each of the first and second plate structures is sealed is the same as the existing process to be used in the conventional technique.

Subsequently, the frame of which the width is 2 mm and the thickness is 1.6 mm is prepared. Then, the second bonding material of which the thickness is 50 μm and the width is 1 mm and which was made of aluminum of 99.99% purity is arranged along the outside of the position to which the frame is arranged on the second plate structure.

After then, the frame is arranged on the second bonding material which has been arranged on the second plate structure, and the first bonding material of which the thickness is 50 μm and the width is 1 mm and which was made of aluminum of 99.99% purity is arranged on the frame along the inside of the frame. Further, the first plate structure is arranged thereon, and alignment of them is properly performed.

Two semiconductor lasers of which the wavelengths are equivalent to that of a near infrared ray are used as the energy beams to be irradiated to the thus arranged work. Further, the spot of one of these beams is arranged to be wholly held in the first bonding material, and the spot of the other of these beams is arranged in the vicinity of the end of the second bonding material so that the 80% area of this spot is held in the second bonding material.

Furthermore, each of these beams is adjusted to have an angle 90° in regard to the surface of the first plate structure.

A laser beam 1 (not illustrated) is moving-irradiated to the first bonding material through the first plate structure at speed 20 mm/sec, and a laser beam 2 (not illustrated) is moving-irradiated to the second bonding material through the first plate structure and the frame at the same speed. Such irradiations are continuously performed surroundedly to the first bonding material and the second bonding material, thereby forming the airtight container. At this time, the energy utilization efficiency of the laser beam in case of bonding by the second bonding material is 16%, and the bonding is performed uniformly. Further, even if the completed airtight container is baked at 300° C., any exfoliation does not occur, and the bonding is excellently maintained.

Incidentally, it should be noted that a series of the above processes takes 15 minutes.

Comparative Example

The laser beam 2 is irradiated to the second bonding material from the direction of the side of the frame as setting the incident angle in regard to the second plate structure to 45°. By doing so, a rise of temperature due to the component acquired by transmission of the laser beam 2 through the frame does not occur. In other words, the rise of temperature is confirmed only by the component acquired by direct transmission of the laser beam 2 to the second bonding material. At this time, the bonding region is about ⅓ in comparison with the above embodiment, and the energy utilization efficiency of the laser beam is 1%.

Subsequently, the completed airtight container is baked at 300° C., and the bonding portion is confirmed. As the result of this confirmation, a crack partially occurred is found, whereby it is impossible to maintain the intensity as the airtight container.

Embodiment 2

The arrangement and the alignment are performed as well as Embodiment 1, and only one laser beam is used for simplifying the apparatus.

As illustrated in FIG. 9, the spot is arranged so that the center of the spot is the end of the first bonding material and that the half of the spot area is irradiated to the second bonding material 15, and the laser beam is moving-irradiated as well as Embodiment 1, thereby forming the airtight container. At this time, the energy utilization efficiency of the laser beam in the bonding by the second bonding material is 10%. Further, as well as Embodiment 1, the bonding is performed uniformly. Furthermore, even if the completed airtight container is baked at 300° C., any exfoliation does not occur, and the bonding is excellently maintained.

Embodiment 3

Two semiconductor lasers of which the wavelengths are equivalent to that of a near infrared ray are used as the energy beams to be irradiated to the work arranged as well as Embodiment 1. Further, the spot of one of these beams is arranged so as to be wholly held in the first bonding material, and the spot the other of these beams is arranged in the vicinity of the center of the second bonding material so as to be wholly held in the second bonding material. Then, the laser beam is moving-irradiated as well as Embodiment 1, thereby forming the airtight container. At this time, the energy utilization efficiency of the laser beam in the bonding by the second bonding material is 20%. Further, as well as Embodiment 1, the bonding is performed uniformly. Furthermore, since the bonding width is wider than that in Embodiment 1, it is possible to solidify the bonding. In any case, even if the completed airtight container is baked at 300° C., any exfoliation does not occur, and the bonding is excellently maintained.

As described above, as compared with Comparative Example, it is possible in Embodiment 3 to efficiently utilize the incident energy, thereby enabling to achieve excellent bonding. Moreover, the apparatus in Embodiment 3 can be simplified as compared with Comparative Example.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-027541, filed Feb. 7, 2008, which is hereby incorporated by reference herein in its entirety.

What is claimed is:

1. A manufacturing method of an airtight container having a first plate structure, a second plate structure having a wiring formed on a surface facing the first plate structure, a frame having a first surface facing the first plate structure and a second surface facing the second plate structure, a first bonding material arranged between the first plate structure and the frame, and a second bonding material arranged between the second plate structure and the frame, the manufacturing method comprising:

a step of locating the wiring between the second bonding material and the second plate structure;

a first bonding step of bonding the first plate structure and the frame by irradiating a first energy beam to the first bonding material by transmitting the first energy beam through the first plate structure;

a second bonding step of bonding the second plate structure and the frame by irradiating a second energy beam to the second bonding material by transmitting the second energy beam through the first plate structure and the frame but not through the first bonding material; and wherein the second bonding step is performed such that the second energy beam is irradiated from the first surface toward the second surface so as to be transmitted through the frame and the second surface, and wherein the first energy beam and the second energy beam are irradiated from one energy source located on a same side of the first plate structure toward the first bonding material and the second bonding material, respectively.

2. A manufacturing method of an airtight container according to claim 1, wherein the first energy beam and the second energy beam are scanned in the same direction and simultaneously with each other.

3. A manufacturing method of an airtight container according to claim 1, wherein the second bonding material has a portion which is positioned below the first bonding material.

4. A manufacturing method of an image displaying apparatus having a display device and an airtight container, the airtight container having a first plate structure, a second plate structure having a wiring formed on a surface facing the first plate structure, a frame having a first surface facing the first plate structure and a second surface facing the second plate structure, a first bonding material arranged between the first plate structure and the frame, and a second bonding material arranged between the second plate structure and the frame, wherein the airtight container is manufactured by a method comprising:

a step of locating the wiring between the second bonding material and the second plate structure;

a first bonding step of bonding the first plate structure and the frame by irradiating a first energy beam to the first bonding material by transmitting the first energy beam through the first plate structure; and a second bonding step of bonding the second plate structure and the frame by irradiating a second energy beam to the second bonding material by transmitting the second energy beam through the first plate structure and the frame but not through the first bonding material, wherein the second bonding step is performed such that the second energy beam is irradiated from the first surface toward the second surface so as to be transmitted through the frame and the second surface, and wherein the first energy beam and the second energy beam are irradiated from one energy source located on a same side of the first plate structure toward the first bonding material and the second bonding material, respectively.

5. A manufacturing method of an image displaying apparatus according to claim 4, wherein the first energy beam and the second energy beam are scanned in the same direction and simultaneously with each other.

6. A manufacturing method of an airtight container according to claim 4, wherein the second bonding material has a portion which is positioned below the first bonding material.

* * * * *